United States Patent [19]

Kato

[11] 4,446,895

[45] May 8, 1984

[54] METHOD FOR FILLING PRESSURIZED GAS INTO A CYLINDER DEVICE

[75] Inventor: Tetsuo Kato, Kanagawa, Japan

[73] Assignee: Tokico Ltd., Kanagawa, Japan

[21] Appl. No.: 356,644

[22] Filed: Mar. 10, 1982

Related U.S. Application Data

[62] Division of Ser. No. 140,861, Apr. 16, 1980, abandoned.

[30] Foreign Application Priority Data

Apr. 20, 1979 [JP] Japan ............................. 54-48815

[51] Int. Cl.³ ..................... B65B 3/04; F16F 9/43
[52] U.S. Cl. ......................... 141/4; 267/64.28; 188/322.21
[58] Field of Search ............... 141/1, 4, DIG. 2, 3, 141/20, 39, 41, 197; 188/322.15, 322.17, 322.16, 322.21; 222/402.16; 137/860; 267/64.28

[56] References Cited

U.S. PATENT DOCUMENTS 4,071,057  1/1978  Nagase ................................. 141/4
4,114,866  9/1978  Kato .................................... 141/4

FOREIGN PATENT DOCUMENTS 605382  5/1960  Italy ............................... 188/322.17

Primary Examiner—Stephen Marcus
Assistant Examiner—Kenneth S. Putnam
Attorney, Agent, or Firm—Wenderoth, Lind & Ponack

[57] ABSTRACT

A cylinder device including a main body defining a cylinder therein, a cap member secured to the main body for closing one end of the cylinder, a piston working in the cylinder and having a piston rod passing through the cap member to project out of the main body, and a seal member surrounding the piston rod and being urged to abut with the inner surface of the cap member. There is provided a cavity between the cap member and the seal member, and an opening formed in the cap member for communicating the cavity with the outside.

4 Claims, 8 Drawing Figures

METHOD FOR FILLING PRESSURIZED GAS INTO A CYLINDER DEVICE

This is a division of application Ser. No. 140,861, filed Apr. 16, 1980, now abandoned.

BACKGROUND OF THE INVENTION

This invention relates to a method of filling pressurized gas into cylinder devices, particularly applicable to hydraulic dampers or gas springs.

For filling gas under pressure into cylinder devices such as hydraulic dampers or gas springs there have been proposed various techniques, drilling a gas filling hole in the wall of the cylinder device, filling the gas into the cylinder through the hole and, thereafter, plugging the hole; and such as, as shown in U.S. Pat. No. 4,114,866, pressing a seal member inwardly against the force of a spring, thereby forming a gas filling passage between the seal member and the cylinder, filling the gas under pressure into the cylinder through the gas filling passage, and releasing the pressing force applied from the outside to outwardly displace the seal member thereby closing the gas filling passage. There are shortcomings in the former technique in that it is troublesome to drill the gas filling hole, that it is necessary to weld the gas filling hole after inserting the plug into the hole, and that it is not possible to adjust the pressure of the gas being filled or to refill the gas. In the latter technique, the construction of a gas filling apparatus incorporating a pressing member for pressing the seal member is complicated and, further, the pressing member must be actuated simultaneously with the supply of the gas under pressure, and thus the operational procedure is complicated and troublesome. Further, it has been proposed as an improved procedure in the latter technique, to omit the pressing member by utilizing the pressure of the gas being filled for inwardly displacing the seal member, thereby forming a gas filling passage along the outer surface of the seal member. However, the outer surface of the seal member usually is engaged with the inner surface of the cylinder or of a cap member closing one end of the cylinder by the force of a spring and, in the initial condition, the pressure of the gas will act on a very limited annular area of the seal member defined between the outer diameter of the piston rod and the inner diameter of the central opening of the cap member passing therethrough the piston rod and, therefore, it is difficult to inwardly displace the seal member without applying a high pressure.

SUMMARY OF THE INVENTION

An object of the invention is to overcome the shortcomings of the last mentioned technique and, to provide a method for filling pressurized gas into a cylinder of the type including a main body defining a cylinder therein, a cap member secured to the main body and closing one end of the cylinder, a piston working in the cylinder and having a piston rod passing through the cap member to project out of the main body, a seal member surrounding the piston rod and being urged to abut with the inner surface of the cap member. There is provided means defining a cavity between the cap member and the seal member, and an opening in the cap member to communicate the cavity with the outside of the device.

Preferably, the cavity has an annular configuration and is defined by an annular recess formed in the inner surface of the cap member or in the outer surface of the seal member.

BRIEF DESCRIPTION OF THE DRAWINGS

Some preferred embodiments of the invention are illustrated in the drawings, in which.

DETAILED DESCRIPTION OF THE PREFERRED EMBODIMENTS

Figure 1:
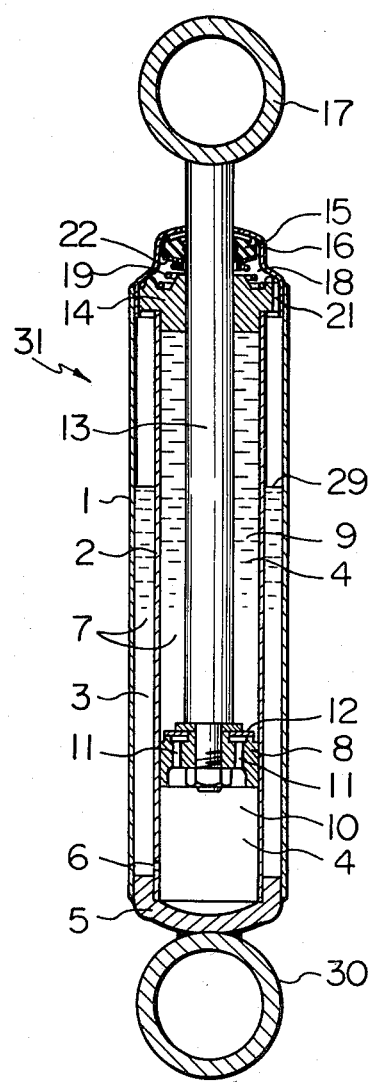
FIG. 1 is a longitudinal sectional view of a hydraulic damper illustrated as a first embodiment of a cylinder device which may be filled according to the invention.
Figure 2:
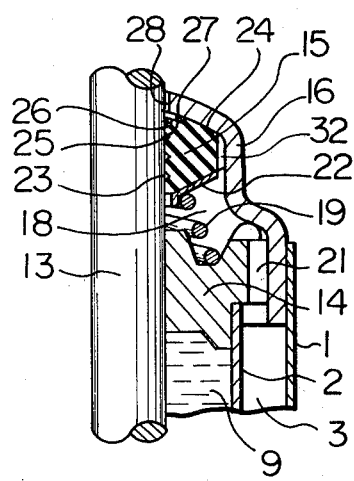
FIG. 2 is an enlarged partial view of an essential portion of FIG. 1.

The cylinder device or the hydraulic damper illustrated in FIGS. 1 and 2 comprises coaxially arranged outer and inner cylinders 1 and 2 which define therebetween an annular chamber 3. The lower ends of cylinders 1 and 2 are closed by a cap 5. A chamber 4 is defined in the cylinder 2 and is divided into chambers 9 and 10 by a piston 8 which will be described hereinafter. Oil 7 is filled in the chamber 4 and in the lower portion of the chamber 3. The oil 7 in the chamber 3 communicates with the oil in the chamber 4 through an opening 6 formed through the cylinder 2. The piston 8 is provided with passages 11 and a disc valve 12 which controls the oil flow passing through the passages 11 thereby generating a damping force during upward and downward movement of the piston in the cylinder. A piston rod 13 is secured to the piston 8 and extends through the oil chamber 9, a rod guide 14, a seal member 15 and a cap member 16 to project outside of the damper. A mounting ring 17 is secured to the outer end of the piston rod 13. The cap member 16 secured to the upper end of the cylinder 1 defines a chamber 18 on the inner side thereof and between the rod guide 14 which is secured to the upper ends of the cylinders 1 and 2. A coil spring 19 is disposed in the chamber 18 for biassing the seal member 15 upwards against the inner surface of the cap member 16. An opening 21 is formed in the rod guide 14 for connecting the chambers 3 and 18. The seal member 15 is formed of flexible material and receives the force of the spring 19 through a retaining plate 22, and the radially inner surface 23 of the seal member 15 slidingly engages with the piston rod 13. The upper surface 24 of the seal member 15 engages with the inner surface of the cap member 16, thereby maintaining the fluid tightness of the chamber 18. Thus, the seal member 15 surrounds the piston rod 13 and is urged to abut with the inner surface of the cap member 16.

According to the invention an annular cavity 25 is formed between the cap member 16 and the seal member 15. The cavity 25 is defined by an annular recess 26 formed in the upper surface 24. In the embodiment of FIG. 2, the bottom surface 27 of the recess 26 is generally parallel with the inner surface of the cap member 16. The cavity 25 is connected permanently with the outside of the damper through an opening 28 formed between the central bore of the cap member 16 and the connecting rod 13 passing through the bore. Gas under high pressure is enclosed in the upper portion of the annular chamber 3. A mounting ring 30 is secured to the cap 5.

The hydraulic damper having the construction described as above is mounted between, e.g. the sprung mass and unsprung mass of a vehicle by means of mounting rings 17 and 30.

Figure 3:
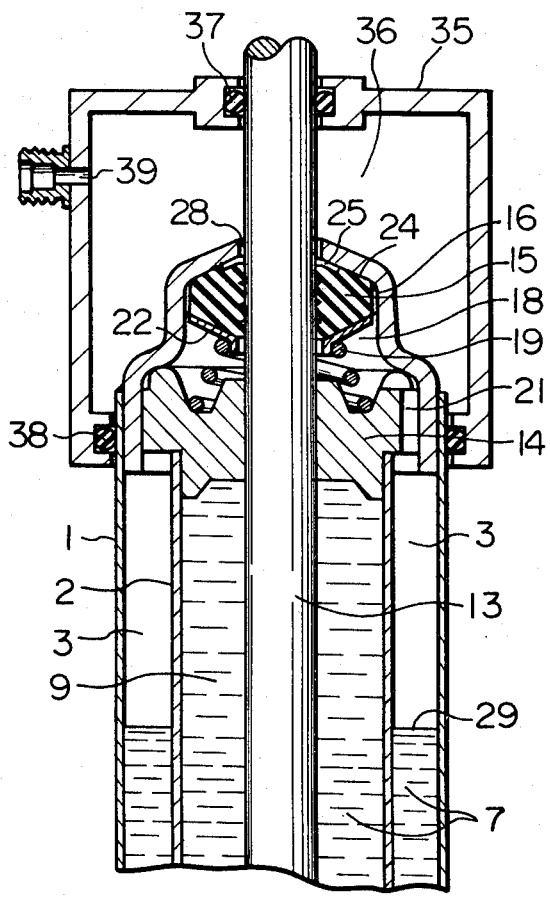
FIG. 3 and FIG. 4 are schematic views illustrating the gas filling method of the invention as applied to the hydraulic damper of FIG. 1.
Figure 4:
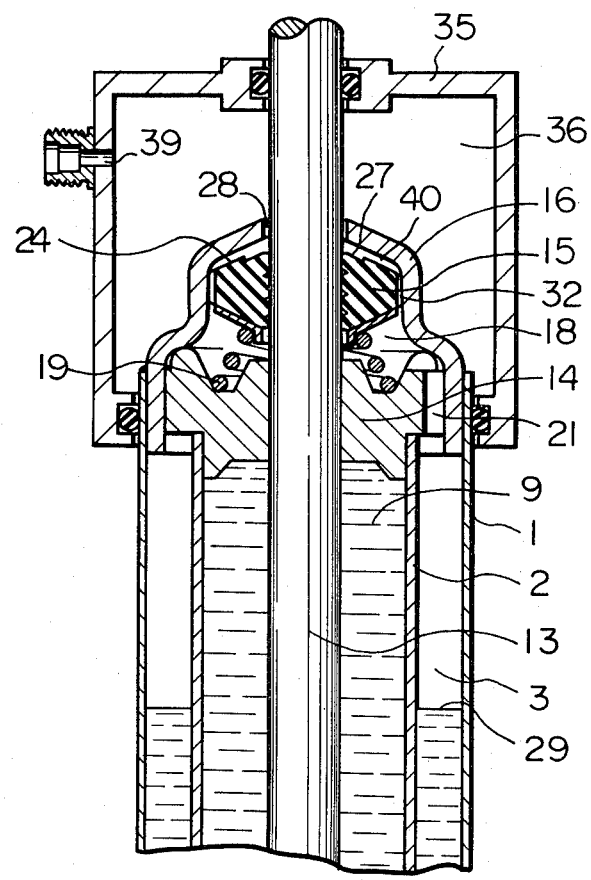

FIGS. 3 and 4 illustrate the process for filling high pressure gas into the hydraulic damper of FIG. 1.

Firstly, the upper end portion of the damper is inserted into a filling container 35 of a gas filling apparatus with the mounting ring 17 not being mounted on the piston rod 13. A chamber 36 defined in the container 35 is sealed by seals 37 and 38. Then, high pressure gas is supplied into the chamber 36 through a gas supplying port 39. The high pressure gas is introduced into the cavity 25 through the opening 28. The high pressure gas supplied into the cavity 25 acts on the seal member 15 to displace it against the force of the spring 19. The seal member 15 separates from the inner surface of the cap member 16 thereby forming a gas filling passage 40, as shown in FIG. 4, between the inner surface of the cap member 16 and the upper surface of the seal member 15. The high pressure gas in the chamber 36 is supplied into the chamber 18 through the passage 40, and introduced into the chamber 3. Preferably, the pressure receiving area of the surface 27, the dimension of the seal member 15, and the force of the spring 19 are determined such that when the pressure of the gas filled into the chambers 3 and 18 is increased to a predetermined pressure the seal member 15 displaces upwardly due to the force of the spring 19, thereby closing the passage 40 with the upper surface 24 of the seal member 15 abutting with the inner surface of the cap member 16. The supply of the high pressure gas into the damper is stopped, and the gas under a predetermined pressure has been filled into the damper.

Figure 5:
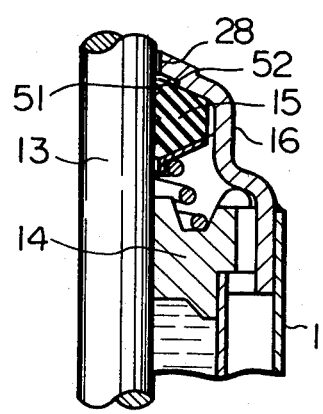
FIG. 5 is a view similar to FIG. 2 but showing a second embodiment of a structure which may be filled according to the invention.
Figure 6:
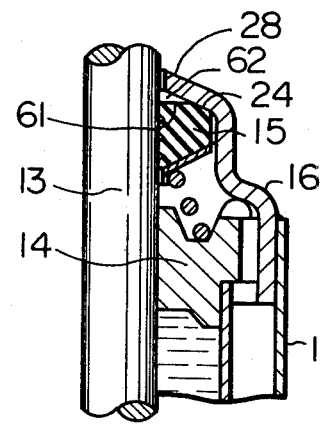
FIGS. 6, 7 and 8 are views similar to FIG. 2 and showing respectively third, fourth and fifth embodiments of structures which may be filled according to the invention.

In the above described embodiment, the cavity 25 is formed by a recess 26 in the seal member 15. In FIG. 5, a cavity 52 is formed by an annular recess 51 provided in the inner surface of the cap member 16. The cavity 52 communicates with the outside through the opening 28. In FIG. 6, a cavity 62 is formed by a recess 61 formed in the upper surface 24 of the seal member 15. The recess 61 is defined by a horizontally extending surface as shown in the drawing.

Figure 7:
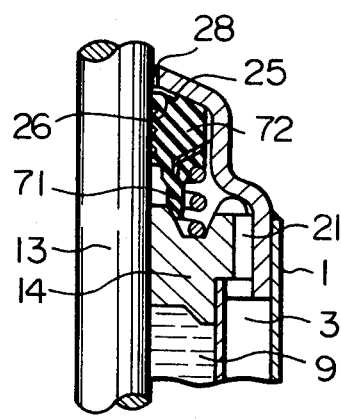

FIG. 7 shows a modified form wherein a seal member 72 engaging with the inner surface of the cap member 50 and with the peripheral surface of the rod guide also has a lip portion 71 engaging with the upper surface of the rod guide 14 to constitute a check valve preventing the high pressure gas in the chambers 3 and 18 from being introduced into the chamber 9.

Figure 8:
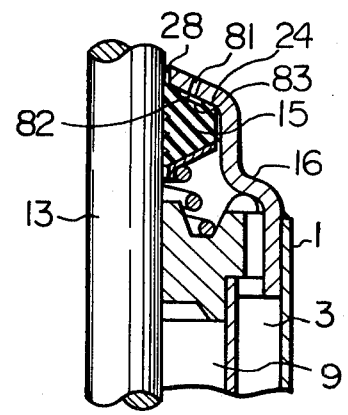

In the above described embodiments the cavity has an annular form as viewed in the vertical direction, but, the cavity may have any desired configuration and, further, a plurality of mutually disconnected cavities may be provided. The cavities in the embodiments is connected with the outside through the central opening 28. However, the cavity may be connected to the outside through an opening distinct from the central opening as shown in FIG 8, wherein an annular cavity 82 is connected to the outside through an opening 81 passing through the cap member 16.

As described heretofore according to the invention, a cavity is formed between the inner surface of the cap member and the upper or outer surface of the seal member and is connected to the outside. Thus, it is possible to omit the seal member pressing member in the prior art gas filling apparatus, thus simplifying the apparatus and simplifying the gas filling operation. Further, the pressure of the gas for displacing the seal member can substantially be reduced as compared with prior art methods, thus enabling a reliable gas filling operation and, further, the pressure of gas being filled can easily be adjusted by a refilling operation.

I claim:

1. A method for filling pressurized gas into a cylinder device of the type including coaxial inner and outer tubes having first ends and second ends, a cap closing said first ends of said inner and outer tubes, a piston slidably disposed in said inner tube, a piston rod secured to said piston and extending therefrom axially outwardly of said inner tube through said second end thereof, a rod guide secured to second ends of said inner and outer tubes, said piston slidably extending through and being guided by said rod guide, a cap member secured to said second end of said outer tube, said cap member having a central opening through which said piston rod extends, with a clearance between said piston rod and said cap member, a seal member located inwardly of said cap member, said piston rod slidably and sealingly extending through said seal member, and a coil spring positioned between said rod guide and said seal member and urging said seal member axially outwardly toward said cap member, said method comprising:

providing said seal member with a radially outer surface spaced radially inward from said cap member;

providing said seal member, on an axially outer surface thereof, with a sealing surface complementary in configuration to an adjacent surface portion of the inner surface of said cap member, such that said coil springs urges said sealing surface into sealing contact with said inner surface portion;

providing a cavity between said inner surface of said cap member and said axially outer surface of said seal member, at a position radially inwardly of said sealing surface and connected to the exterior through said clearance;

sealingly surrounding the exterior of said cap member with a filling container of a gas filling apparatus;

introducing pressurized gas into the interior of said filling container, thereby introducing said pressurized gas into said clearance and said cavity and acting on a pressure receiving area of said seal member defined by said cavity, said gas being at a pressure sufficient to move said entire seal member axially inwardly against the force of said coil spring such that said sealing surface is spaced from said inner surface portion of said cap member to form a gas filling passage therebetween, said pressure receiving area of said seal member and the dimension of said seal member being determined to permit said movement of said entire seal member, and thereby filling said pressurized gas into the interior of said cylinder device;

stopping the supply of said pressurized gas into said interior of said filling container when said pressurized gas is filled into said interior of said cylinder device to a predetermined pressure;

reducing the pressure in said filling container to a level such that the spring force of said spring and the pressure in the cylinder device act to move said entire seal member axially outwardly until said sealing surface contacts said inner surface portion, thereby closing the gas filling passage; and thereafter removing said filling container from said cylinder device.

2. A method as claimed in claim 1, wherein said cavity is provided by forming an annular recess in said inner surface of said cap member.

3. A method as claimed in claim 1, wherein said cavity is provided by forming an annular recess in said axially outer surface of said seal member.

4. A method as claimed in claim 1, wherein said filling of said pressurized gas into said cylinder device is performed without axial displacement of said piston rod relative to said cap member.

* * * * *